(12) United States Patent
Kusaka et al.

(10) Patent No.: US 6,348,231 B1
(45) Date of Patent: Feb. 19, 2002

(54) METHOD FOR PREPARATION OF DEODORIZED MUSHROOM POWDER

(75) Inventors: Iwao Kusaka, Kanagawa; Michitaka Shimizu, Saitama, both of (JP)

(73) Assignees: Santomi Sangyo Co., Ltd, Tokyo (JP); Shirako Co., Ltd., Tokyo (JP)

(*) Notice: Subject to any disclaimer, the term of this patent is extended or adjusted under 35 U.S.C. 154(b) by 0 days.

(21) Appl. No.: 09/627,793

(22) Filed: Jul. 27, 2000

(30) Foreign Application Priority Data

Jul. 28, 1999 (JP) .......................................... 11-214024
Feb. 10, 2000 (JP) ...................................... 2000-033152

(51) Int. Cl.[7] ............................ A23B 4/03; A23B 4/033; A23B 4/12

(52) U.S. Cl. ...................... 426/640; 426/615; 426/488

(58) Field of Search ................................ 426/615, 640, 426/488

*Primary Examiner*—Helen Pratt
(74) *Attorney, Agent, or Firm*—Sughrue Mion, PLLC

(57) ABSTRACT

The present invention relates to a method for preparation of a powder with no unpleasant odor at a higher β-glucans content and a larger bulk density but with a smaller bacterial number, from the fruit body of Maitake or Yamabushitake, comprising immersing the fruit body of Maitake or Yamabushitake in a heated aqueous acid solution followed by drying and grinding. The aqueous acid solution includes aqueous solutions of inorganic acids such as hydrochloric acid, sulfuric acid, and phosphoric acid and edible organic acids such as acetic acid, citric acid, malic acid, tartaric acid and succinic acid. Acetic acid or citric acid is preferable in terms of cost and effect.

5 Claims, No Drawings

METHOD FOR PREPARATION OF DEODORIZED MUSHROOM POWDER

BACKGROUND OF THE INVENTION

1. Field of the Invention

Maitake in Japanese [*Grifola frondosa* (Fr.) (pers. ex Fr.)] (a kind of mushroom) is a source of vegetable proteins and edible fiber. Additionally, it has been reported recently that β-glucans in Maitake exerts various pharmacological effects such as anticancer effect, dementia-preventing effect, immune enhancing effect, tumor-suppressing effect, hair-growing effect and blood glucose-decreasing effect. In Japan and USA, dosage forms using Maitake as a raw material have been marketed already as nutritious supplements and health food products. Additionally, it has been known that Yamabushitake in Japanese [*Hericium erinaceum* (Bull. ex Fr.) Pers.] (an another kind of mushroom) also contains a lot of β-glucans. Like Maitake, research works for the application of Yamabushitake to nutritious supplements and health food products have been under way. For such purposes, dosage forms using extracts (hot-water extract or alkali hot-water extract further fractionated and purified as so-called D-fraction) of Maitake or Yamabushitake is general. It is said that by the extraction, components with particularly excellent pharmacological effects in β-glucans can be concentrated greatly. According to recent research works, however, concomitant dosing of β-glucans and the proteins in the mushroom further enhances the pharmacological effect of β-glucans. By the hot-water extraction method or alkali hot-water extraction method, most of the proteins and fiber in the mushroom remains in the extraction residue, with the resultant less quantity in the extract.

2. Description of the Related Art

So as to effectively utilize β-glucans in Maitake and Yamabushitake but also the vegetable proteins and fiber therein, research works for preparing Maitake or Yamabushitake as they are as dry powder have made a progress. However, Maitake and Yamabushitake emit unpleasant odor when dried, and when prepared into powder as they are, the odor is enhanced more. This is a serious drawback for merchandising and marketing Maitake powder or Yamabushitake powder as health food products.

SUMMARY OF THE INVENTION

It is a purpose of the present invention to provide a method for preparation of a deodorized mushroom powder from the fruit body of Maitake or Yamabushitake, particularly a deodorized mushroom powder containing not only β-glucans but also proteins and fiber abundantly in a convenient manner and at low cost.

DETAILED DESCRIPTION OF THE INVENTION

The method for preparation of a deodorized mushroom powder according to the invention comprises immersing the fruit body of Maitake or Yamabushitake in a heated aqueous acid solution, followed by drying and grinding.

The powder of the fruit body of Maitake or Yamabushitake as recovered by the method is with significantly reduced unpleasant odor. β-glucans are transferred to the extract when the fruit body is immersed in hot water or alkali hot water. However, β-glucans are never transferred to the extract when the fruit body is immersed in aqueous acid solution but is recovered as solid. The proteins and fiber are also recovered as solid. Furthermore, it has been found that the dried powder of the fruit body of Maitake or Yamabushitake as recovered in accordance with the invention is at a significantly large bulk density, compared with the powder dried with no acid treatment of the fruit body of Maitake or Yamabushitake.

DESCRIPTION OF THE PREFERRED EMBODIMENTS

As the aqueous acid solution, use is made of aqueous inorganic acid solution or aqueous edible organic acid solution. The inorganic acid includes hydrochloric acid, sulfuric acid, and phosphoric acid; the edible organic acid includes acetic acid, citric acid, malic acid, tartaric acid and succinic acid. In any of the cases, deodorizing effects can be observed. From the viewpoint that the products must be edible and from the viewpoint of working environment and liquid waste disposal problem, edible organic acids are preferably used. Among edible organic acids, acetic acid or citric acid is preferable in terms of cost and effect. As such acetic acid, use can be made of synthetic acetic acid, brewed vinegar, and fruit vinegar such as wine vinegar, papaya vinegar and apple vinegar.

The concentration of aqueous acid solution varies, depending on the kind of the acid used. When organic acids such as acetic acid and citric acid are used, the concentration thereof is preferably within the range of 0.01 to 1%. Below 0.01%, the deodorizing effect is less; and β-glucans may leak into the immersion solution. From the viewpoint of deodorizing effect, the upper limit of the acid concentration is with no specific limitation. From the respect of the volume of water for washing after immersion treatment and work, the upper limit of the acid concentration is appropriately about 1%. The acid concentration of an inorganic acid to be used is satisfactorily lower than the acid concentration of an organic acid to be used.

The temperature of the aqueous acid solution is appropriately within the range of 40° C. to 100° C. Below 40° C., the immersion time gets longer, involving the reduction of operability. Above 100° C., a pressurized container is required for such immersion, involving higher equipment cost and reduced operability.

The immersion time in the aqueous acid solution varies, depending on the kind of acid, concentration and temperature of the aqueous acid solution and depending on the size of cut pieces of Maitake and Yamabushitake. Preferably, the range is within 10 minutes to 30 minutes. For 10 minutes, the deodorizing effect can be observed; for 30 minutes, almost complete deodorization can be attained. Accordingly, no more immersion is then required.

EXAMPLES AND COMPARATIVE EXAMPLES

The constitution and advantages of the invention are now described in more detail with reference to the following examples and comparative examples. Maitake fruit body cut in appropriate pieces (about 5 to 10 g) was immersed and treated in various immersion agents at given temperatures (50 to 100° C.) for a given period of time (10 minutes or 30 minutes) to remove the immersion agents; then, the fruit body was rinsed in water and dried. The dried product was further ground. The resulting powder product was subjected to an organoleptic test by randomly selected panelists to determine the unpleasant odor index (residual ratio of unpleasant odor) in numerical figure. Non-treated mushroom powder was ranked as unpleasant odor index score of 10; a mushroom powder with no unpleasant odor was ranked as the score of 0. The results are shown in Tables 1 to 4.

TABLE 1

| Immersion agent | Temperature (° C.) | Time (minute) | Unpleasant odor index |
|---|---|---|---|
| Water (Comparative Example) | 100 | 10 | 4 |
| Water (Comparative Example) | 100 | 30 | 2 |
| 1% Acetic acid (Example) | 100 | 10 | 2 |
| 1% Acetic acid (Example) | 100 | 30 | 0 |
| Non-treated (direct drying) | | | 10 |

TABLE 2

| Immersion agent | Temperature (° C.) | Time (minute) | Unpleasant odor index |
|---|---|---|---|
| Water (Comparative Example) | 80 | 10 | 4 |
| Water (Comparative Example) | 80 | 30 | 3 |
| 0.25% Acetic acid (Example) | 80 | 10 | 2 |
| 0.25% Acetic acid (Example) | 80 | 30 | 0 |
| 0.1% Acetic acid (Example) | 80 | 10 | 3 |
| 0.1% Acetic acid (Example) | 80 | 30 | 0 |
| Non-treated (direct drying) | | | 10 |

TABLE 3

| Immersion agent | Temperature (° C.) | Time (minute) | Unpleasant odor index |
|---|---|---|---|
| Water (Comparative Example) | 60 | 10 | 4 |
| Water (Comparative Example) | 60 | 30 | 3 |
| 0.1% Acetic acid (Example) | 60 | 10 | 3 |
| 0.1% Acetic acid (Example) | 60 | 30 | 0 |
| 0.5% Citric acid (Example) | 60 | 10 | 3 |
| 0.5% Citric acid (Example) | 60 | 30 | 1 |
| 0.5% Malic acid (Example) | 60 | 10 | 3 |
| 0.5% Malic acid (Example) | 60 | 30 | 2 |
| 25% Acetate ethyl ester (Comparative Example) | 60 | 10 | 7 |
| 25% Acetate ethyl ester (Comparative Example) | 60 | 30 | 7 |
| 25% Acetone (Comparative Example) | 60 | 10 | 7 |
| 25% Acetone (Comparative Example) | 60 | 30 | 6 |
| Non-treated (direct drying) | | | 10 |

TABLE 4

| Immersion agent | Temperature (° C.) | Time (minute) | Unpleasant odor index |
|---|---|---|---|
| Water (Comparative Example) | 50 | 10 | 4 |
| Water (Comparative Example) | 50 | 30 | 3 |
| 0.5% Acetic acid (Example) | 50 | 10 | 2 |
| 0.5% Acetic acid (Example) | 50 | 30 | 0 |
| 1% Citric acid (Example) | 50 | 10 | 2 |
| 1% Citric acid (Example) | 50 | 30 | 0 |
| Non-treated (direct drying) | | | 10 |

The same test was carried out for Yamabushitake. The results are shown in Table 5. Similar results to those of Maitake were obtained.

TABLE 5

| Immersion agent | Temperature (° C.) | Time (minute) | Unpleasant odor index |
|---|---|---|---|
| Water (Comparative Example) | 80 | 10 | 5 |
| Water (Comparative Example) | 80 | 30 | 4 |
| 0.25% Acetic acid (Example) | 80 | 10 | 3 |
| 0.25% Acetic acid (Example) | 80 | 30 | 0 |
| 0.1% Acetic acid (Example) | 80 | 10 | 3 |
| 0.1% Acetic acid (Example) | 80 | 30 | 0 |
| Non-treated (direct drying) | | | 10 |

Non-immersed hot air-dried Maitake powder (sample 1), 0.02% citric acid-immersed, hot air-dried Maitake powder (sample 2), 0.01% acetic acid-immersed, hot air-dried Maitake powder (sample 3), the liquid waste from the acid treatment thereof (sample 4) and 0.01% acetic acid-immersed, hot air-dried Yamabushitake powder (sample 5) were subjected to an analysis at a public organization. The results are shown in Table 6. Herein, the unpleasant odor index and bulk density are from our in-house data.

TABLE 6

| | Sample 1 hot air-dried Maitake powder | Sample 2 acid-treated Maitake powder | Sample 3 acid-treated Maitake powder | Sample 4 liquid waste from acid treatment of Maitake | Sample 5 acid-treated Yamabushi-take powder |
|---|---|---|---|---|---|
| Acid | | citric acid | acetic acid | acetic acid | acetic acid |
| Acid concentration | | 0.02% | 0.01% | 0.01% | 0.01% |
| Temperature for acid treatment | | 80° C. | 85° C. | 85° C. | 85° C. |
| Time period for acid treatment | | 15 minutes | 15 minutes | 15 minutes | 15 minutes |
| Drying temperature | 85° C. | 85° C. | 60° C. | | 60° C. |
| Drying time | 10 hours | 10 hours | 10 hours | | 10 hours |
| Analysis value | g/100 g | g/100 g | g/100 g | g/100 g | g/100 g |
| Water content | 5.9 | 5.7 | 6.2 | 99.2 | 4.0 |
| Proteins | 34.7 | 30.3 | 26.4 | 0.4 | 30.6 |
| Lipid | 3.4 | 4.8 | 4.5 | 0.1 | 6.0 |
| Fiber | 14.3 | 13.4 | 11.6 | 0 | 11.1 |
| Ash | 7.2 | 3.7 | 3.7 | 0.2 | 3.5 |
| Sugar | 34.5 | 42.1 | 47.6 | 0.1 | 44.8 |
| β-glucans (a part of Sugar) | 18.1 | 26.9 | 25.9 | not detected | 26.1 |
| General bacterial number | $6.9 \times 10^3$ | 300 or less | $3.6 \times 10^3$ | $4.1 \times 10^7$ | $3.0 \times 10^3$ |
| *Escherichia coli* group (Sample volume tested) | positive | negative/ 2.22 g | positive/ 0.1 g | negative/ 2.22 g | positive/ 1 g |
| Salmonella | negative/25 g | negative/25 g | negative/25 g | negative/25 g | negative/25 g |
| Unpleasant odor index | 10 | 0 | 0 | | 0 |
| Bulk density | 0.35 g/ml | 0.74 g/ml | 0.73 g/ml | | 0.78 g/ml |

Sample 1 (comparative product) was prepared by drying Maitake in hot air with no preliminary treatment (immersion treatment in aqueous acid solution) to prepare powder; and sample 2 (inventive product) was prepared by immersing Maitake in 0.02% citric acid and drying the resulting solid in hot air to prepare powder. Comparison between the samples 1 and 2 indicates that the sample 2 as the inventive product was totally with no unpleasant odor and contained more than 25% by weight of β-glucans as the effective component of Maitake, which is about 1.5-fold the content in the sample 1. This is possibly owing to the treatment with the aqueous acid solution, which serves to stabilize β-glucans and other sugars in Maitake against heat and concentrate β-glucans and other sugars with no decomposition at the subsequent hot air-drying process. Additionally, the bulk density of the sample 1 was 0.35 g/ml, while the bulk density of the sample 2 was 0.74 g/ml. Thus, the bulk density of the sample 2 was 2-fold or more that of the sample 1. At a small bulk density, the resulting fine powder can hardly be administered during dosing because the fine powder is dusty or causes choking. At a large bulk density, the resulting powder can readily be administered. The finding of the 2-fold bulk density and the 1.5-fold β-glucans content indicates that an apparent quantity (in volume) of mushroom powder required for the same β-glucans dose is only ⅓-fold. Even the number of capsules required for encapsulating the powder is ⅓-fold, advantageously. Additionally, the sample 1 is at the general bacterial number of $6.9 \times 10^3$, while the sample 2 is at the general bacterial number of 300 or less. Because the drying conditions are the same, the difference is considered as the effect of the immersion treatment in acid.

The sample 3 is a Maitake powder prepared by immersion in 0.01% acetic acid and drying in hot air. The sample 3 is with no unpleasant odor, at a high β-glucans content, and a high bulk density, like the sample 2; but the general bacterial number of the sample 3 was far larger than that of the sample 2. This may be due to the fact that the acid concentration at 0.01% was insufficient for sterilization. For concurrent sterilization, therefore, the acid concentration is satisfactorily 0.02% or more, like the sample 2. The sample 4 is the liquid waste of the acid treatment of the sample 3. It is noted that no β-glucans are detected in the liquid waste.

The sample 5 is the hot air-dried powder of Yamabushi-take after immersion in 0.01% acetic acid. The analysis results are almost the same as those of the samples 2 and 3, but the bulk density is larger than those of the samples. However, the general bacterial number is considerably larger than that of the sample 2. Thus, the acid concentration is satisfactorily 0.02% or more as in the sample 2.

The aforementioned results indicate that the acid concentration is 0.01% or more, preferably 0.02% or more; the temperature of the aqueous acid concentration is 40° C. or more, preferably 60° C. or more; and the immersion time is 10 minutes or more, preferably 15 minutes or more.

The powder of the fruit body of Maitake or Yamabushi-take as prepared in accordance with the invention is with no unpleasant odor, at a higher β-glucans content and a larger bulk density but with a smaller bacterial number.

What is claimed is:

1. A method for preparation of a deodorized mushroom powder, comprising immersing the fruit body of Maitake or Yamabushitake in a heated aqueous acid solution followed by drying and grinding.

2. A method for preparation of a deodorized mushroom powder according to claim 1, wherein the temperature of the aqueous acid solution is within the range of 40° C. to 100° C.

3. A method for preparation of a deodorized mushroom powder according to claim 1 or 2, wherein the immersion time in the aqueous acid solution is within the range of 10 minutes to 30 minutes.

4. A method for preparation of a deodorized mushroom powder according to claim 1, 2, wherein the aqueous acid solution is an aqueous solution of an edible organic acid.

5. A method for preparation of a deodorized mushroom powder according to claim 4, wherein the concentration of the edible organic acid in the aqueous acid solution is within the range of 0.01 to 1%.

* * * * *